(12) United States Patent
Lin (10) Patent No.: US 7,784,505 B2
(45) Date of Patent: Aug. 31, 2010

(54) WOODWORKING MACHINE WITH AN ADJUSTABLE FEEDING UNIT AND AN ADJUSTABLE PRESSING WHEEL UNIT

(76) Inventor: Chin-Chi Lin, No. 473, Sanfong Rd., Houli Township, Taichung County (TW)

( * ) Notice: Subject to any disclaimer, the term of this patent is extended or adjusted under 35 U.S.C. 154(b) by 146 days.

(21) Appl. No.: 12/274,274

(22) Filed: Nov. 19, 2008

(65) Prior Publication Data

US 2010/0122616 A1 May 20, 2010

(51) Int. Cl.
*B27B 31/00* (2006.01)
(52) U.S. Cl. ............... 144/242.1; 144/245.1; 144/253.6; 144/286.5; 144/245.2
(58) Field of Classification Search ...... 144/286.1–287, 144/242.1, 245.1, 245.2, 250.17, 253.1, 253.4, 144/253.7, 253.9; 83/409, 412; 198/608, 198/611, 612
See application file for complete search history.

(56) References Cited

U.S. PATENT DOCUMENTS

| 2,722,247 | A * | 11/1955 | Schroeder et al. | ............ 83/446 |
| 6,578,461 | B1 * | 6/2003 | Loo | ............ 83/423 |
| 6,619,347 | B2 * | 9/2003 | Jukoff et al. | ............ 144/253.6 |

* cited by examiner

*Primary Examiner*—Shelley Self
(74) *Attorney, Agent, or Firm*—McDermott Will & Emery LLP (57) ABSTRACT

A woodworking machine includes a worktable, a feeding device, a pressing wheel device, and a cutter disposed between the feeding device and the pressing wheel device. The feeding device includes a feeding unit, and at least two positioning members connected to the feeding unit and locked releaseably on a side portion of the worktable. The pressing wheel device includes a pressing wheel unit, and at least two positioning members connected to the pressing wheel unit and locked releaseably on an opposite side portion of the worktable. The pressing wheel unit presses a workpiece against the feeding unit.

6 Claims, 9 Drawing Sheets

WOODWORKING MACHINE WITH AN ADJUSTABLE FEEDING UNIT AND AN ADJUSTABLE PRESSING WHEEL UNIT

BACKGROUND OF THE INVENTION

1. Field of the Invention

This invention relates to a woodworking machine, and more particularly to a woodworking machine that includes an adjustable feeding unit and an adjustable pressing wheel unit.

2. Description of the Related Art

Figure 1:
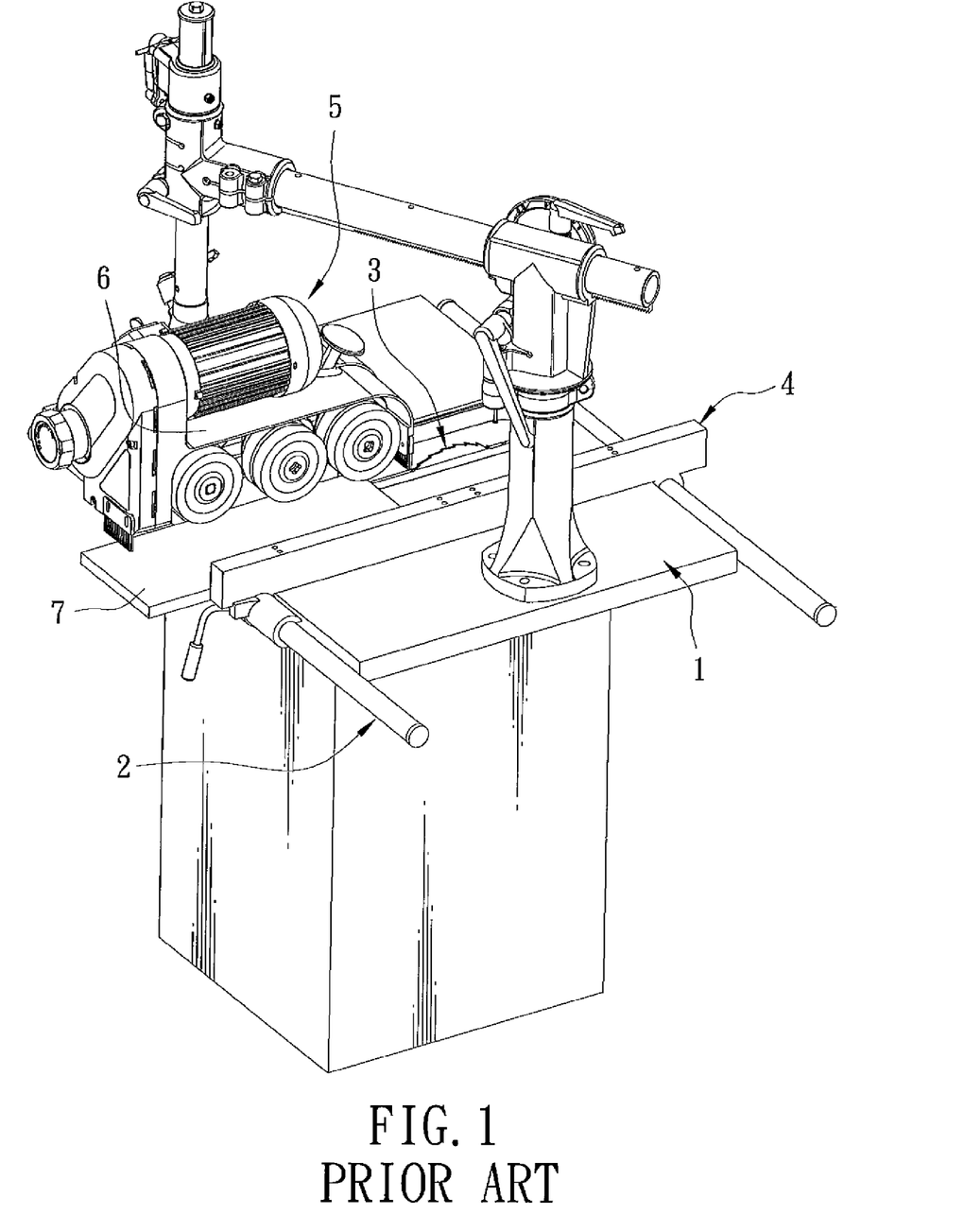
FIG. 1 is a perspective view of a conventional table saw.

Referring to FIG. 1, a conventional woodworking machine, such as a table saw, includes a worktable 1 permitting a workpiece 7 to be placed thereon, two parallel sliding rails 2 disposed respectively on two opposite sides of the worktable 1, a cutter 3 extending upwardly from the worktable 1, a fence 4 disposed above the worktable 1 and connected movably to the sliding rails 2, and a feeder 5 mounted on the worktable 1. When the workpiece 7 is placed on the worktable 1 to abut against the fence 4, a feeding unit 6 of the feeder 5 is driven to move and allow the workpiece to be cut by the cutter 3.

The aforesaid conventional woodworking machine suffers from the following disadvantages:
(1) Due to the presence of the sliding rails 2 and the fence 4, the space occupied by the machine is relatively large. Furthermore, the worktable 1 cannot be replaced.
(2) Since the feeding unit 6 presses the workpiece 7 downwardly against the worktable 1, the load of the worktable 1 is increased.

SUMMARY OF THE INVENTION

The object of this invention is to provide a woodworking machine that can overcome the above-mentioned disadvantages associated with the prior art.

According to this invention, a woodworking machine includes a worktable, a feeding device, a pressing wheel device, and a cutter disposed between the feeding device and the pressing wheel device. The feeding device includes a feeding unit, and at least two positioning members connected to the feeding unit and locked releaseably on a side portion of the worktable. The pressing wheel device includes a pressing wheel unit, and at least two positioning members connected to the pressing wheel unit and locked releaseably on an opposite side portion of the worktable. The pressing wheel unit presses a workpiece against the feeding unit.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 2:
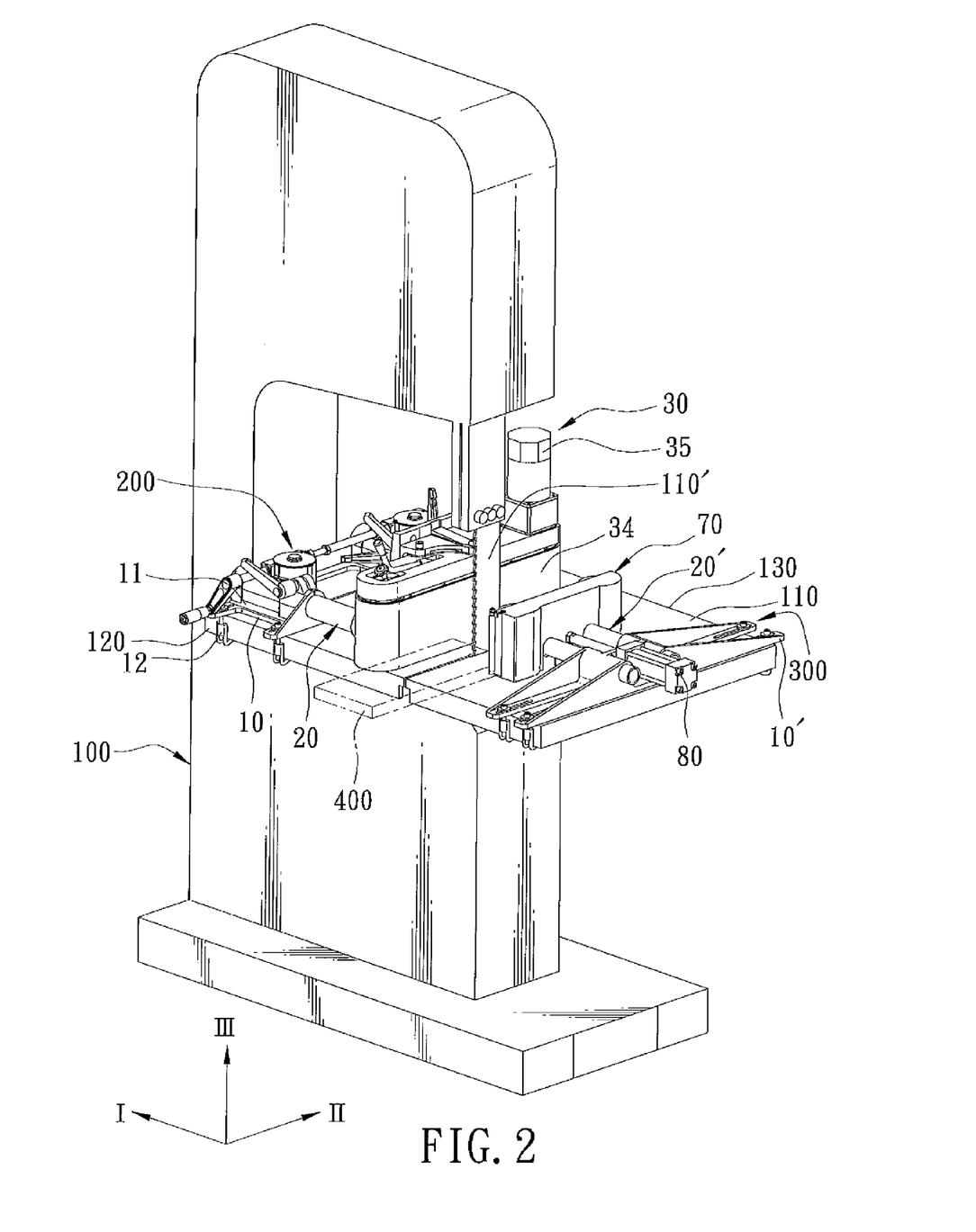
FIG. 2 is a perspective view of the preferred embodiment of a woodworking machine according to this invention.
Figure 3:
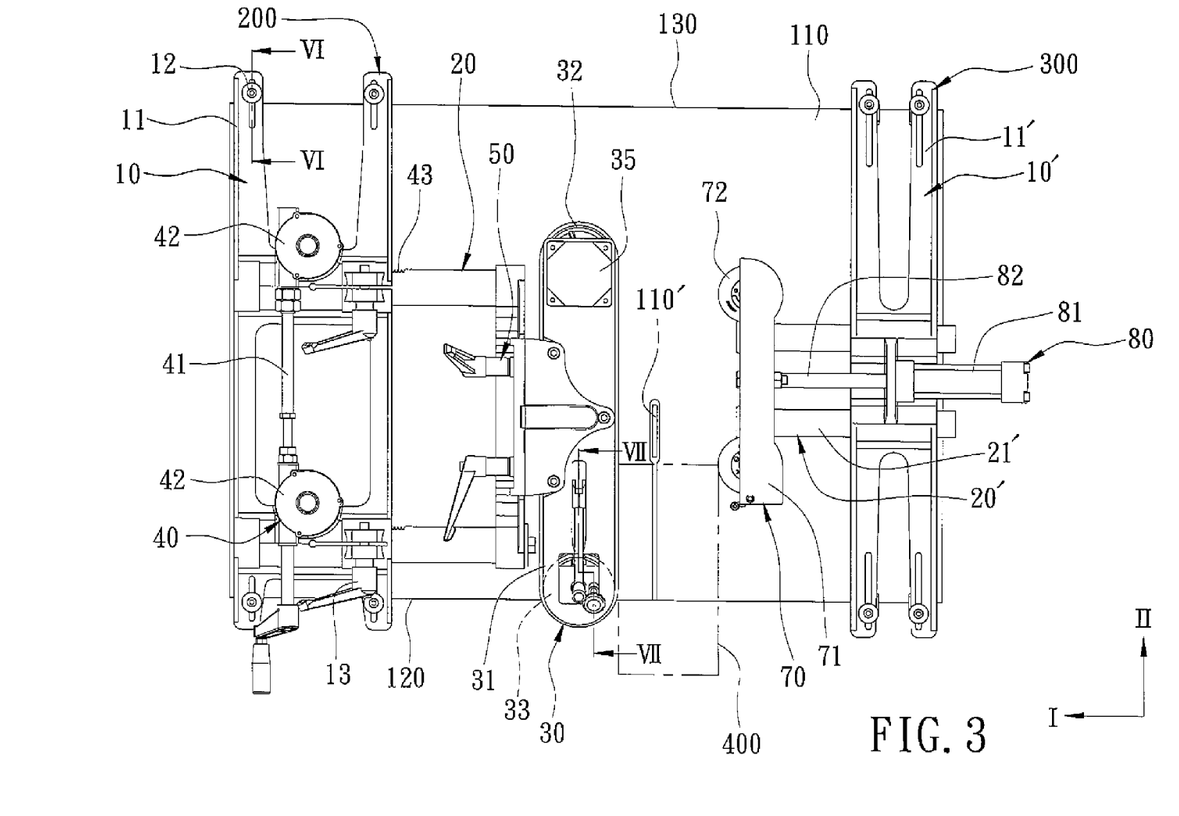
FIG. 3 is a top view of the preferred embodiment.
Figure 4:
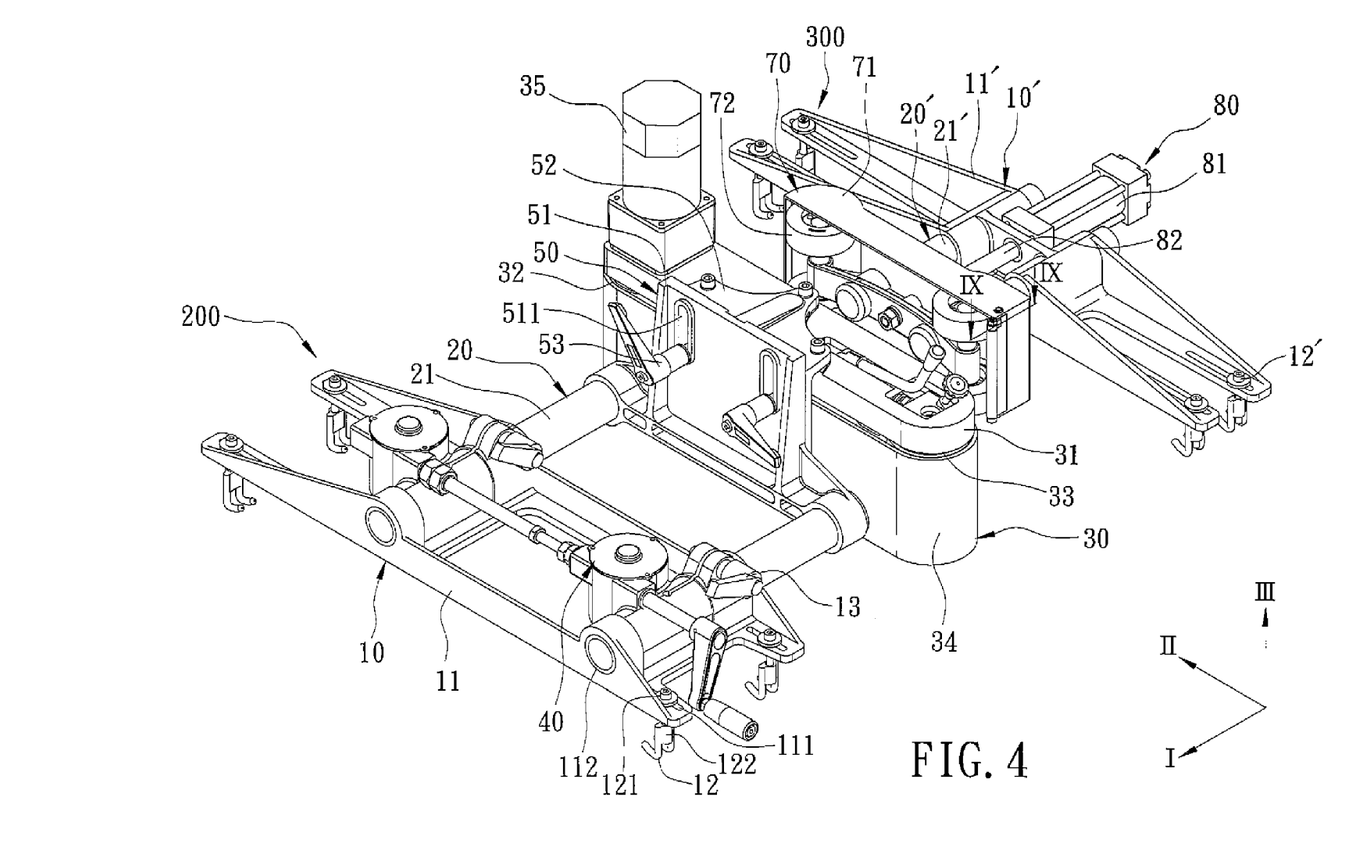
FIG. 4 is a fragmentary perspective view of the preferred embodiment.

Referring to FIGS. 2, 3, and 4, the preferred embodiment of a woodworking machine of this invention is a band saw machine, and is used to cut a workpiece 400. The woodworking machine includes a machine bed 100, a feeding device 200, and a pressing wheel device 300. The machine bed 100 includes a worktable 110 permitting the workpiece 400 to be placed thereon, and a cutter 110'. The worktable 110 has first and second sides 120, 130 extending in a first direction (I) and opposite to each other in a second direction (II) perpendicular to the first direction (I). The cutter 110' extends upwardly from the worktable 110 in a third direction (III) perpendicular to the first and second directions (I, II).

The feeding device 200 is disposed on the left side portion of the worktable 110, and includes a first anchoring unit 10, a first sliding unit 20, a feeding unit 30, a horizontal adjusting unit 40, and a height adjusting unit 50.

Figure 5:
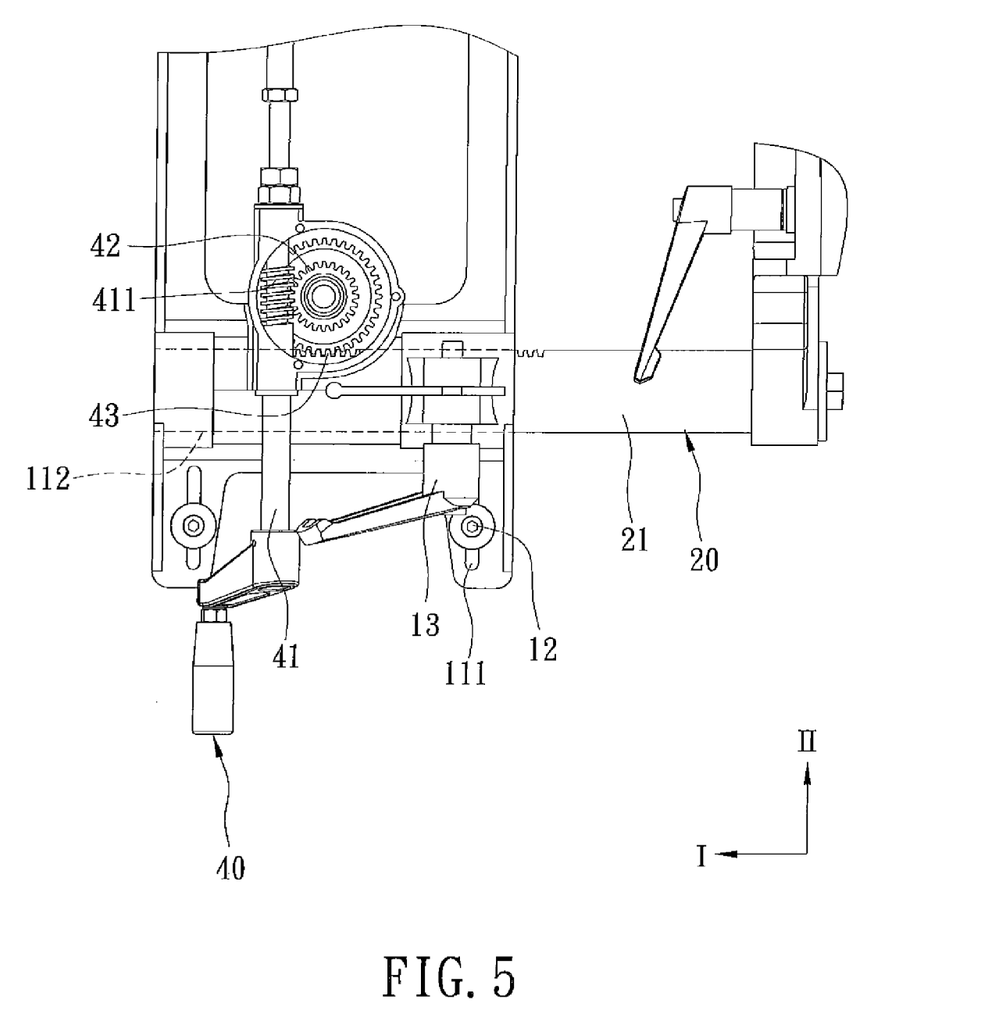
FIG. 5 is a schematic view of a first anchoring unit and a horizontal adjusting unit of the preferred embodiment.
Figure 6:
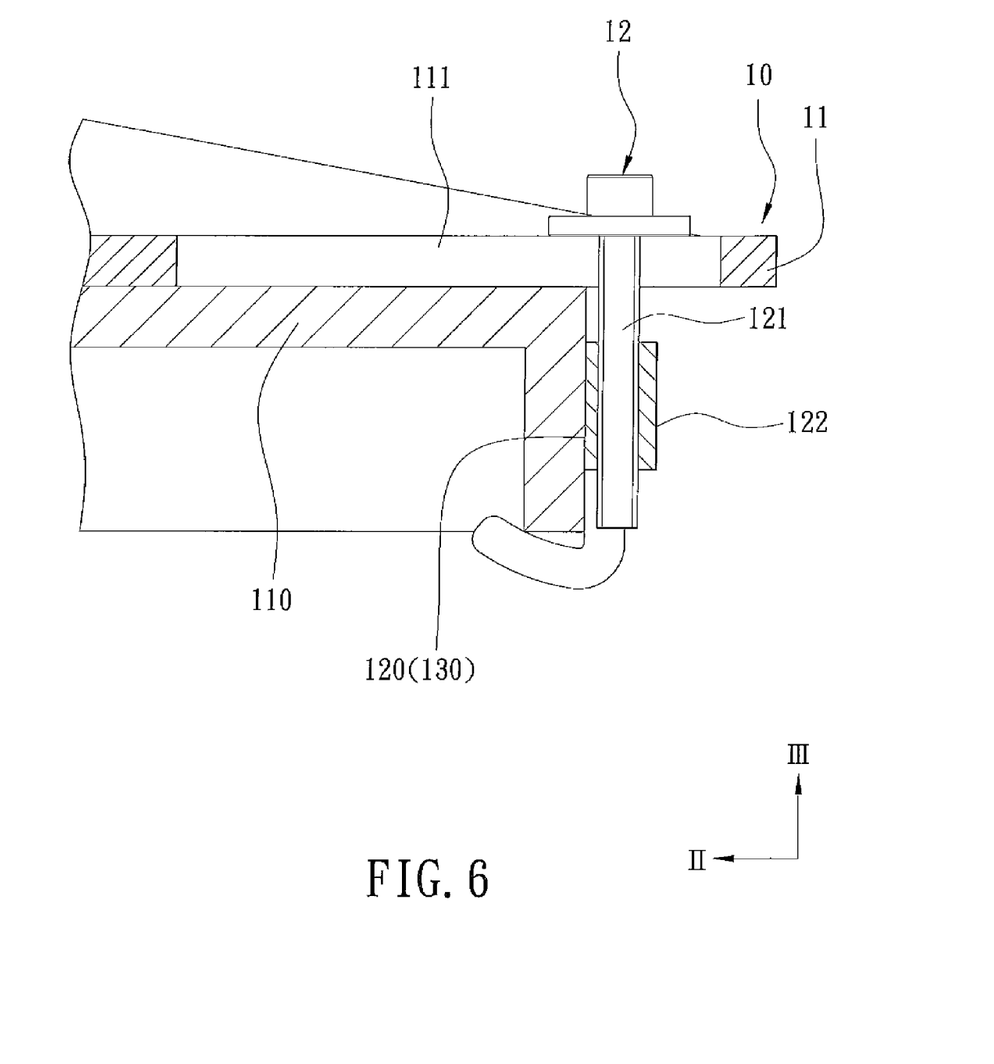
FIG. 6 is a sectional view taken along Line VI-VI in FIG. 3.

With further reference to FIGS. 5 and 6, the first anchoring unit 10 includes a first body 11, two pairs of positioning members 12, and two locking members 13. The first body 11 has two pairs of slots 111 extending in the second direction (II), and two slide holes 112 extending in the first direction (I). Each positioning member 12 includes a bolt 121 extending through the corresponding slot 111, and a retaining hook 122 connected threadedly to the bolt 121 to allow position adjustment of the retaining hook 122 relative to the first body 11 in the third direction (III) to thereby allow one side 120, 130 of the worktable 110 and the first body 11 to be clamped between a top end portion of the bolt 121 and a bottom end portion of the retaining hook 122. Since the slots 111 extend in the second direction (II), position adjustment of each retaining hook 122 relative to the first body 11 in the second direction (II) is allowed. Further, since each positioning member 12 can be locked releaseably at any position of each of the first and second sides 120, 130 of the worktable 110, the position of the first body 11 relative to the worktable 110 can be adjusted in the first direction (I).

The first sliding unit 20 includes two sliding rods 21 disposed respectively within the slide holes 112. Each locking member 13 is operable to lock the corresponding sliding rod 21 within the corresponding slide hole 112.

Figure 7:
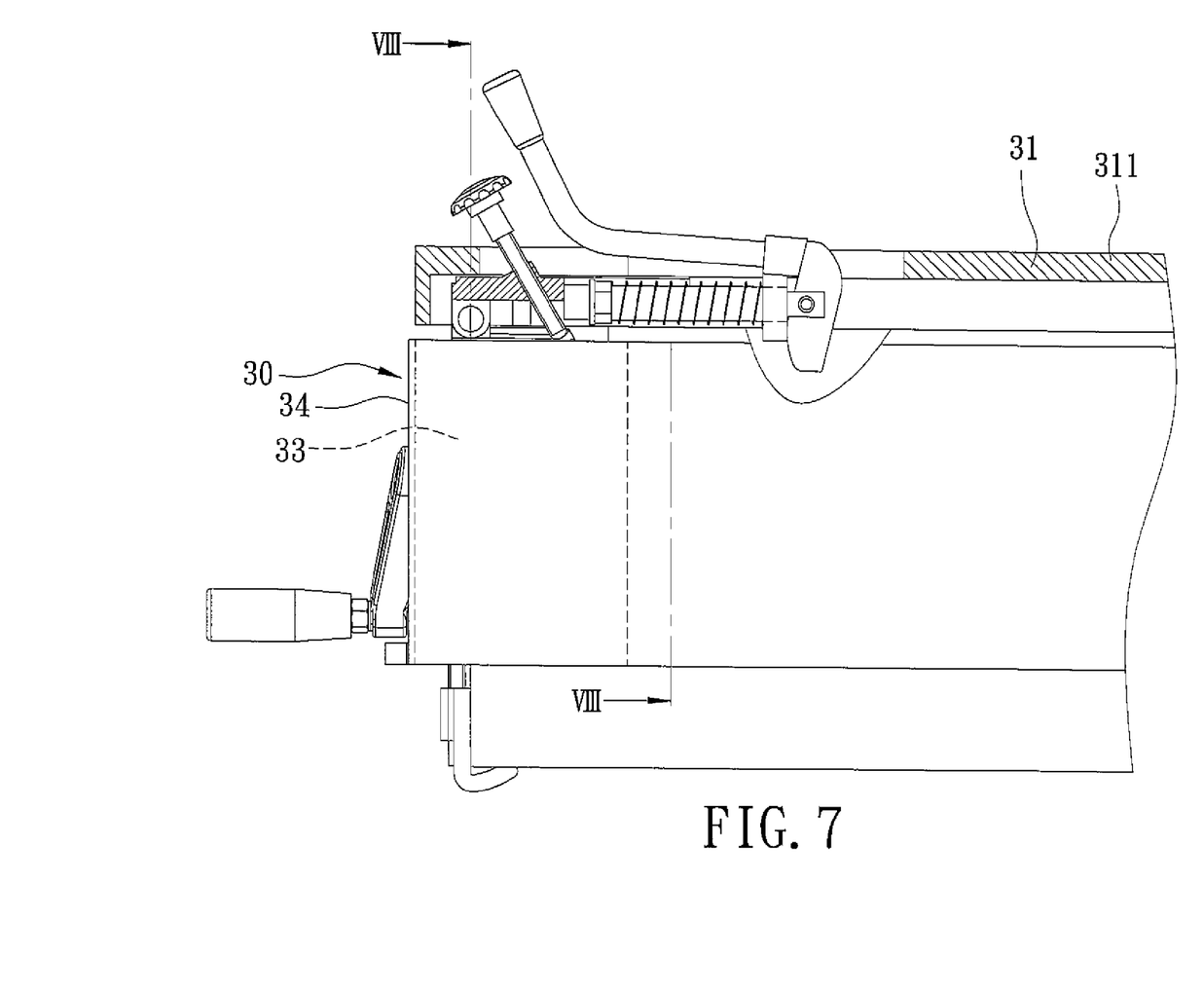
FIG. 7 is a sectional view taken along Line VII-VII in FIG. 3.
Figure 8:
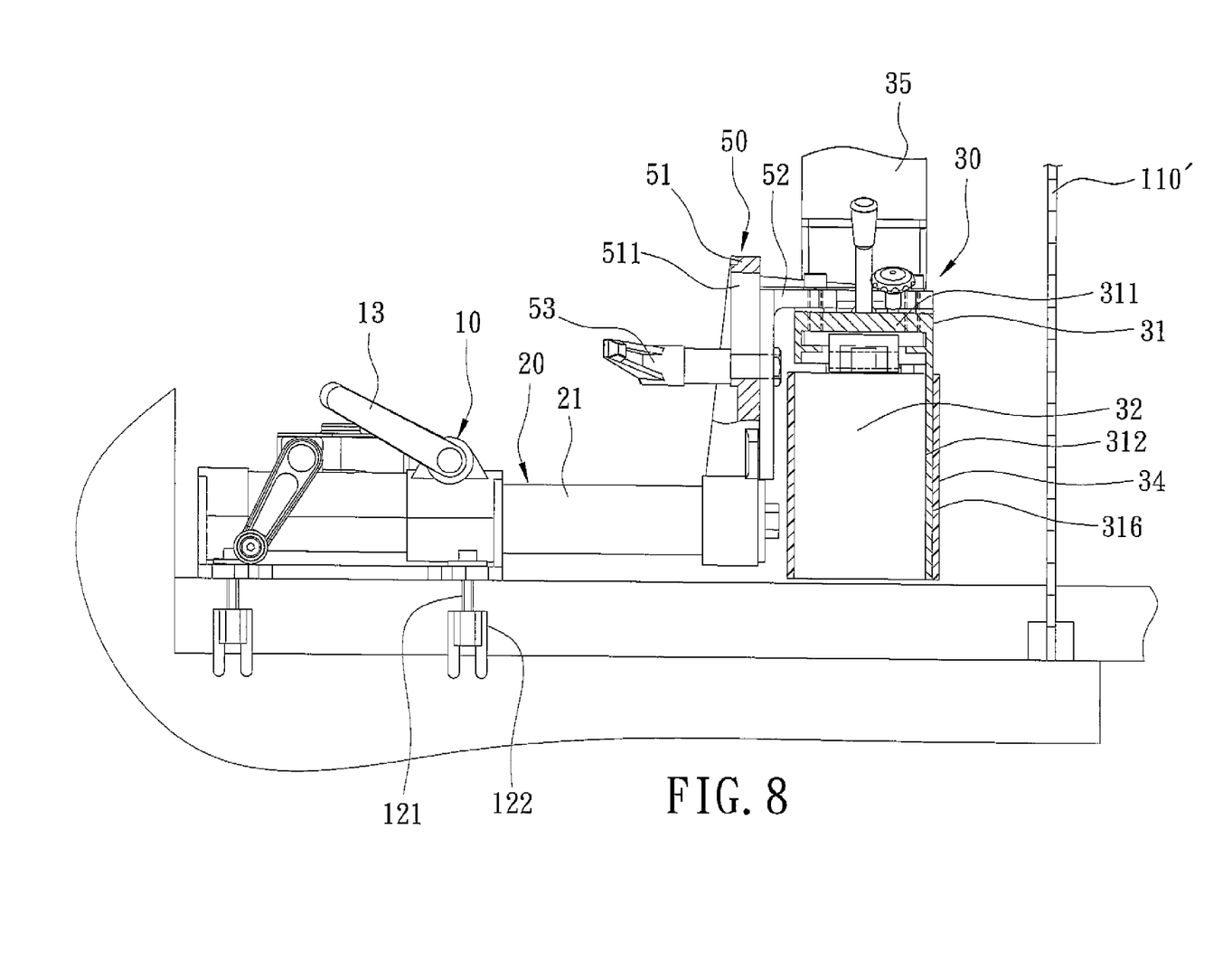
FIG. 8 is a sectional view taken along Line VIII-VIII in FIG. 7.

With further reference to FIGS. 7 and 8, the feeding unit 30 includes a frame body 31 connected to the first sliding unit 20, first and second rollers 32, 33 disposed on the frame body 31 and spaced apart from each other in the second direction (II), a transmission belt 34 trained on the first and second rollers 32, 33, and a driving member 35 for driving rotation of the first and second rollers 32, 33 and the transmission belt 34. The frame body 31 includes a top plate 311, and a vertical stop plate 312 connected to a side of the top plate 311 and having an abutment face 316 perpendicular to the worktable 110 and extending in the second direction (II) The transmission belt 34 abuts against the abutment face 316.

The horizontal adjusting unit 40 is disposed on the first anchoring unit 10, and includes an elongated driving member 41, two pinions 42 driven by the driving member 41, and two racks 43 respectively and fixedly on the sliding rods 21 and meshing respectively with the pinions 42. The driving member 41 includes a worm rod 411 meshing with the pinions 42.

The height adjusting unit 50 includes a support frame 51 disposed fixedly on ends of the sliding rods 21, a sliding frame 52 movable relative to the support frame 51 in the third direction (III), and two locking members 53 for locking the sliding frame 52 on the support frame 51. The support frame 51 has two guide slots 511 permitting the locking members 53 to extend respectively therethrough. The sliding frame 52 is connected fixedly to the frame body 31.

The pressing wheel device 300 is aligned with the feeding device 200 such that the cutter 110' is disposed therebetween. The pressing wheel device 300 is disposed on the right side portion of the worktable 110, and includes a second anchoring unit 10', a second sliding unit 20', a pressing wheel unit 70, and a biasing member 80.

The second anchoring units 10' includes a second body 11' and two pairs of positioning members 12', and is similar in construction to the first anchoring unit 10. The second sliding unit 20' includes two sliding rods 21', and is similar in construction to the first sliding unit 20.

Figure 9:
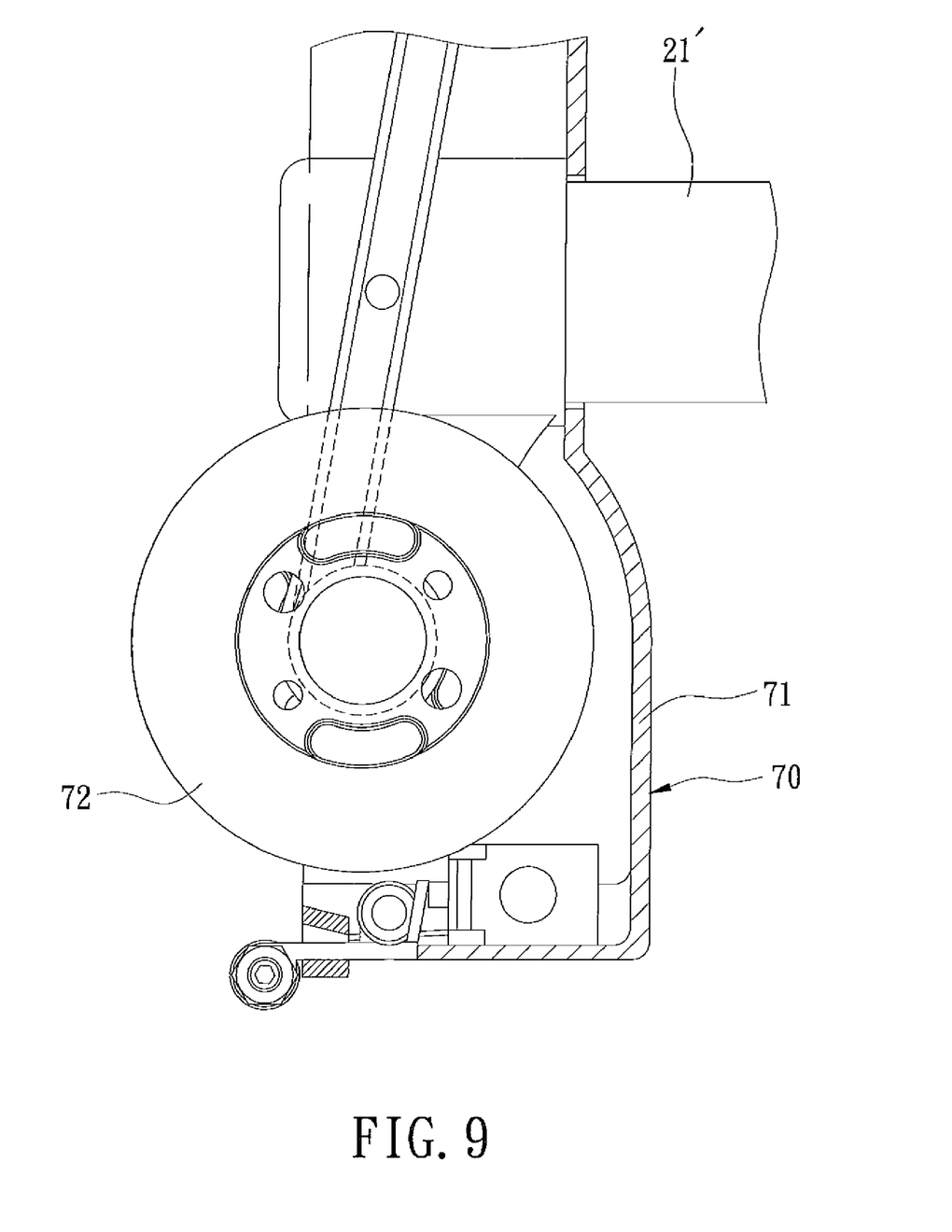
FIG. 9 is a sectional view taken along Line IX-IX in FIG. 4.

With further reference to FIG. 9, the pressing wheel unit 70 includes a housing 71 connected fixedly to the sliding rods 21', and two pressing wheels 72 disposed rotatably on the housing 71.

The biasing member 80 is a pneumatic cylinder, and includes a cylinder body 81 disposed fixedly on the second anchoring unit 10', and a piston rod 82 connected to the pressing wheel unit 70. Thus, the biasing member 80 biases the pressing wheel unit 70 toward the abutment face 316 to press the workpiece 400 against the feeding unit 30.

When the workpiece 400 is pushed from the first side 120 into a space between the feeding unit 30 and the pressing wheel unit 70, and when the driving member 35 is operated, the workpiece 400 is moved on the worktable 110 in the second direction (II) to perform a cutting operation. Due to the presence of the biasing member 80, the woodworking machine of this embodiment is suitable for the workpiece 400 of a small width range.

The locking members 13 can be loosened so that the horizontal adjusting unit 40 can he operated to adjust the distance between the first body 11 and the feeding unit 30. Furthermore, the positioning members 12, 12' are operable to adjust the positions of the first and second bodies 11, 11' relative to the worktable 110. As such, the feeding device 200 and the pressing wheel device 300 can be mounted to the worktable 110 of different width or thickness.

With particular reference to FIGS. 4 and 8, the locking members 53 can be loosened to allow the sliding frame 52 and, thus, the feeding unit 30 to be moved upwardly relative to the support frame 51 to form a space between the feeding unit 30 and the worktable 110 that is large enough to allow for replacement of the transmission belt 34. After the transmission belt 34 is replaced with a new one, the feeding unit 30 is moved downwardly back to its original position.

The woodworking machine of this invention has the following advantages:
(1) The space occupied by the machine is reduced due to omission of the guide rails 2 (see FIG. 1) and the fence 4 (see FIG. 1) of the above-mentioned conventional machine.
(2) Since the pressing wheel unit 70 presses the workpiece 400 against the feeding unit 30 in the first direction (I) the load of the worktable 110 is relatively small.
(3) Through operation of the positioning members 12, 12', the feeding device 200 and the pressing wheel device 300 can be mounted to the worktables 110 of different widths or different thicknesses.

With this invention thus explained, it is apparent that numerous modifications and variations can be made without departing from the scope and spirit of this invention. It is therefore intended that this invention be limited only as indicated by the appended claims.

I claim:
1. A woodworking machine comprising:
a machine bed including a worktable adapted to permit a workpiece to be placed thereon, and a cutter extending upwardly from said worktable, said worktable having opposite first and second sides;
a feeding device including
a first anchoring unit including a first body and at least two positioning members connected to said first body and locked releaseably on said worktable,
a first sliding unit mounted adjustably to said first anchoring unit to allow for position adjustment of said first sliding unit on said first anchoring unit in a first direction, and
a feeding unit including a frame body connected to said first sliding unit, two rollers disposed on said frame body and spaced apart from each other in a second direction perpendicular to the first direction, a transmission belt trained on said rollers, and a driving member for driving rotation of said rollers and said transmission belt, said frame body having an abutment face perpendicular to said worktable and extending in the second direction, said transmission belt abutting against said abutment face; and
a pressing wheel device aligned with said feeding device such that said cutter is disposed therebetween, said pressing wheel device including
a second anchoring unit including a second body and at least two positioning members connected to said second body and locked releaseably on said worktable,
a second sliding unit mounted adjustably to said second anchoring unit to allow for position adjustment of said second sliding unit on said second anchoring unit in the first direction,
a pressing wheel unit connected to said second sliding unit and including at least two pressing wheels, and
a biasing member for biasing said pressing wheel unit toward said abutment face.

2. The woodworking machine as claimed in claim 1, wherein said positioning members of each of said first and second anchoring units are disposed respectively on said first and second sides of said worktable, and each of said positioning members of said feeding device and said pressing wheel device is adjustable in position relative to a corresponding one of said first and second bodies in the second direction, and includes a retaining hook that is adjustable in position relative to the corresponding one of said first and second bodies in a third direction perpendicular to the first and second directions.

3. The woodworking machine as claimed in claim 2, wherein each of said first and second bodies of said feeding device and said pressing wheel device has at least two slots extending in the second direction, each of said positioning members of said feeding device and said pressing wheel device further including a bolt extending through a corresponding one of said slots and connected to said retaining hook.

4. The woodworking machine as claimed in claim 1, wherein said first anchoring unit has two slide holes extending in the first direction, said first sliding unit including two sliding rods disposed respectively within the slide holes, said feeding device further including a horizontal adjusting unit disposed on said first anchoring unit, said horizontal adjusting unit including a driving member, two pinions driven by said driving member, and two racks disposed respectively and fixedly on said sliding rods, said driving member of said horizontal adjusting unit including a worm rod meshing with said pinions, said pinions meshing respectively with said racks.

5. The woodworking machine as claimed in claim 1, wherein said feeding device further includes a height adjusting unit, said height adjusting unit including a support frame disposed fixedly on said first sliding unit, a sliding frame movable relative to said support frame in a third direction perpendicular to the first and second directions, and a locking member for locking the sliding frame on said support frame, said support frame having two guide slots permitting said locking members to extend respectively therethrough, said sliding frame being connected to the frame body.

6. The woodworking machine as claimed in claim 1, wherein said second anchoring unit has two slide slots extending in the first direction, the second anchoring unit including two sliding rods disposed respectively within the slide slots, the biasing member being a pneumatic cylinder and including a cylinder body disposed fixedly on the second anchoring unit, and a piston rod connected to the pressing wheel unit.

* * * * *